(No Model.)
W. J. IRWIN.
COTTON CHOPPER.
No. 274,780. Patented Mar. 27. 1883.
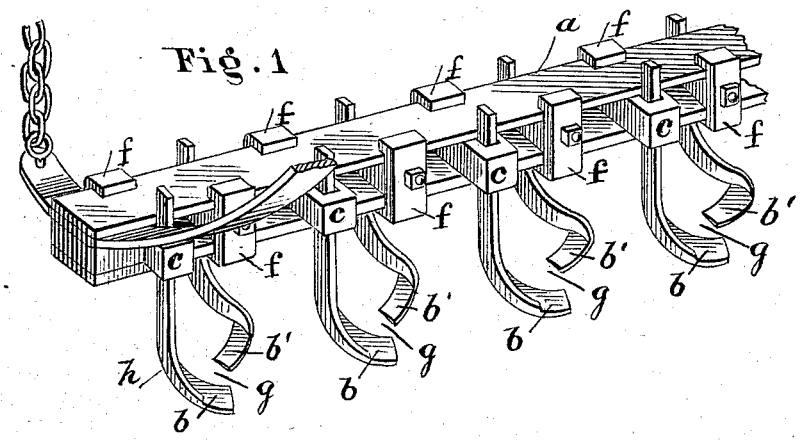
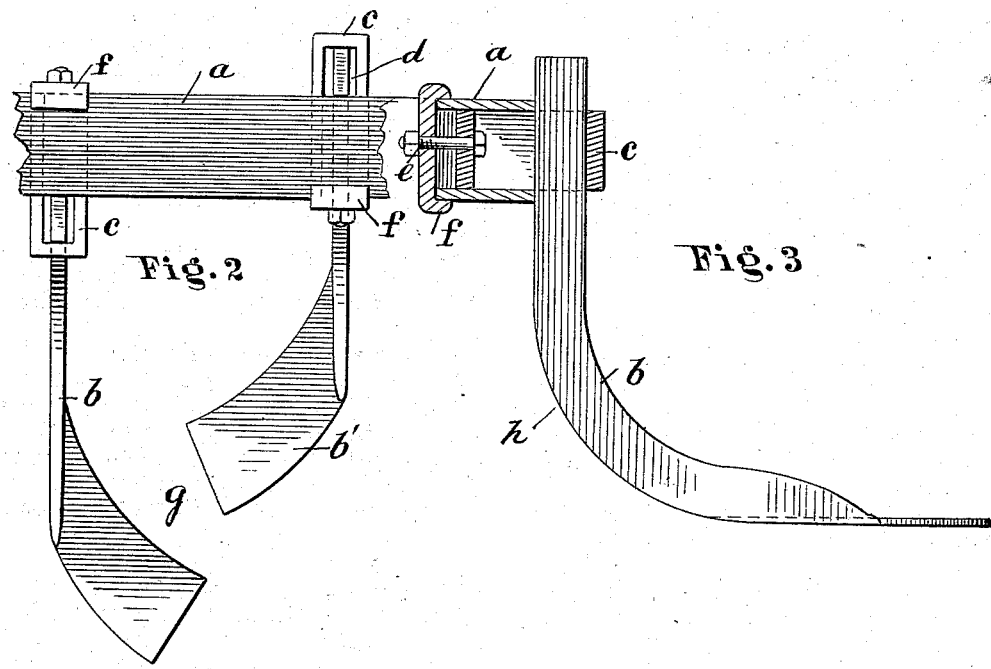
Attest
J. B. Lisle
John H. Johnson
William J. Irwin
Inventor
by
Henry Millward
his attorney

UNITED STATES PATENT OFFICE.

WILLIAM J. IRWIN, OF SPRINGFIELD, OHIO, ASSIGNOR TO HIMSELF AND JACOB B. LISLE, OF SAME PLACE.

COTTON-CHOPPER.

SPECIFICATION forming part of Letters Patent No. 274,780, dated March 27, 1883.

Application filed October 23, 1882. (No model.)

*To all whom it may concern:*

Be it known that I, WILLIAM J. IRWIN, of Springfield, county of Clarke, State of Ohio, have invented a new and useful Improvement in Cotton-Choppers, of which the following is a specification.

In the accompanying drawings, Figure 1 is a perspective view of a hoe-bar of a cotton-chopper, illustrating the construction and arrangement of my improved hoes. Fig. 2 is a plan view, drawn to an enlarged scale, as is the case with each of the other figures, of two of my improved hoes, showing their configuration and the way I prefer to arrange them; and Fig. 3 is a side sectional elevation of the hoe-bar and holders with one hoe inserted therein.

The present invention is made as an improvement on the cotton-chopper patented to Jacob B. Lisle, June 20, 1882, and numbered 259,770; and the machine in its general features, and as to such parts as are omitted from my drawings as not necessary to a thorough understanding of my invention, may be found in the specification of the patent above referred to.

The invention consists in the arrangement and configuration of the hoes for the purpose of obviating the difficulties arising from an accumulation of cotton or weeds in front of the hoes, as will be more fully hereinafter specified.

In the drawings letters of like character represent corresponding parts in each of the figures.

In order that others skilled in the art to which my invention belongs may make and use the same, I will proceed to describe its construction and operation.

The hoe-bar $a$ is attached to a cotton-chopper by drag-bars hinged to the main frame at one end, and suspended at the other by lever and link connections in any suitable manner to permit of the hoes being lifted from the ground whenever it becomes desirable to throw them out of use.

The hoes $b\ b'$ are attached to the hoe-bar $a$ in the following manner: The hoe-bar is constructed of two pieces of bar-iron in the manner clearly illustrated by the drawings. The hoe-holders consist of a rectangular hoe-box, $c$, having an aperture, $d$, for the reception of the hoe-shank, a screw-bolt, $e$, by means of which the aforesaid may be drawn tightly against the vertical sides of the hoe-bar, and a cap, $f$, provided with cleats fitting over the edges of the bar-iron composing the hoe bar. The hoes $b\ b'$ are placed on the hoe-bar so that if one is on the front side of said bar the next is on the rear, in order that the cutting-edges of the one may be in advance of the other of each pair of hoes. The horizontal cutting-edges of the hoes are shaped to produce a shearing cut, and each pair of hoes are so located and arranged in relation to each other that an oblique channel, $g$, is formed between them for the passage of vegetable matter that would otherwise accumulate in front of them, and at the same time the two hoes will cut the full measure of their combined width.

The front edges, $h$, of the hoe-shanks are sharpened, so as to be capable of making a vertical cut while the horizontal part makes a horizontal cut.

The cleats upon the caps $f$, alternating with each other from one side to the other of the hoe-bar, serve to keep the horizontal plates that form the same from springing or twisting out of shape and otherwise stiffen the bar.

Having thus described my invention, what I claim as new, and desire to secure by Letters Patent, is—

1. In a cotton-chopper, the curved hoes $b\ b'$, having their horizontal cutting-edges capable of producing a shearing cut, and located on opposite sides of the bar $a$, so as to form between them an oblique channel for the purpose of clearance for vegetable matter that would otherwise clog their cutting-edges.

2. In a cotton-chopper, hoes $b\ b'$, arranged in pairs in a hoe-bar, and having their horizontal cutting-edges capable of producing a shearing cut, and arranged and located so as to form between them an oblique channel, for the purpose specified, in combination with alternating hoe-holders $a\ c\ e\ f$, used for the double purpose of holding the hoes and stiffening the hoe-bar.

In testimony whereof I have hereunto set my hand this 20th day of October, 1882.

WILLIAM J. IRWIN.

Witnesses:
E. S. WALLACE,
J. B. LISLE.